Jan. 12, 1971     A. E. CARLILE     3,553,796
PLASTIC SNAP FASTENER
Filed April 16, 1968     2 Sheets-Sheet 1
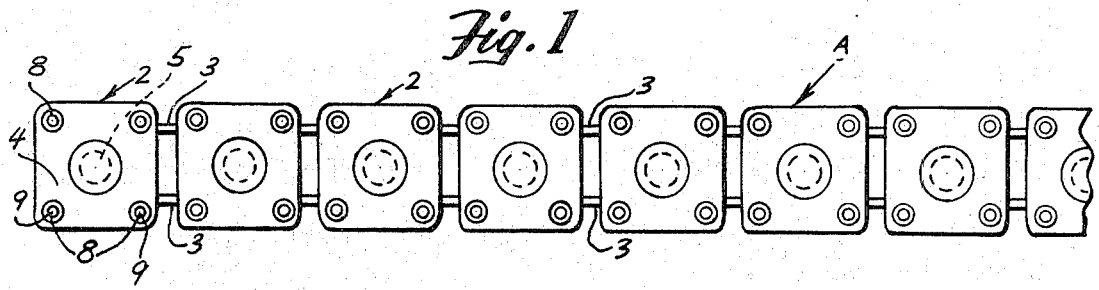
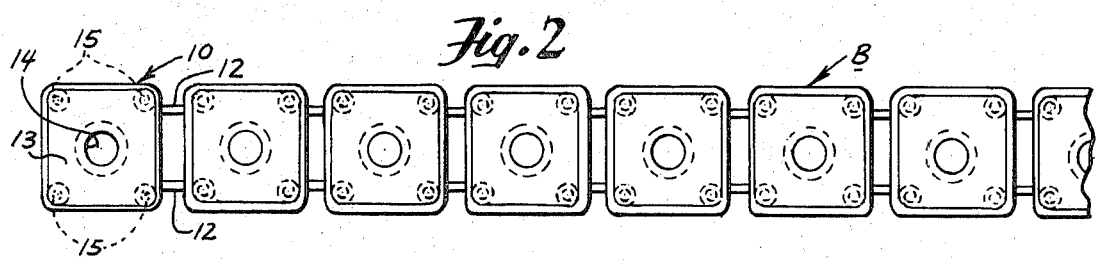
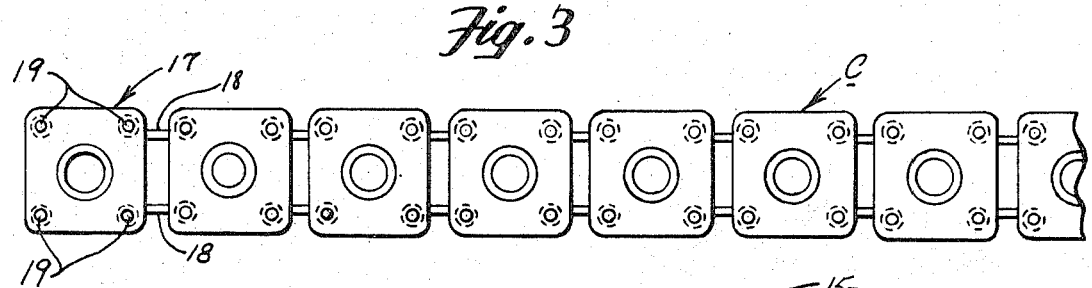
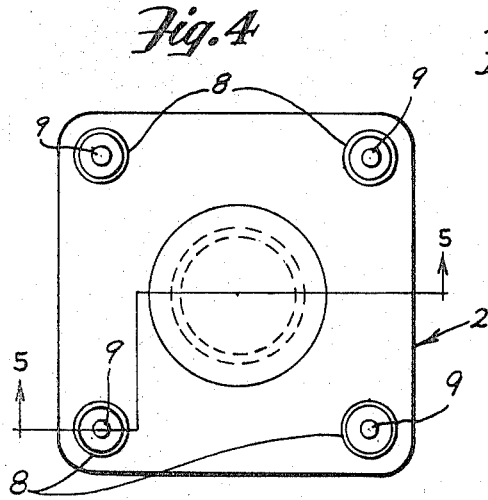
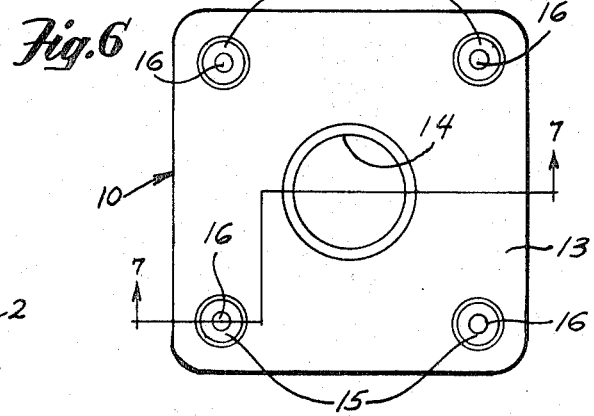
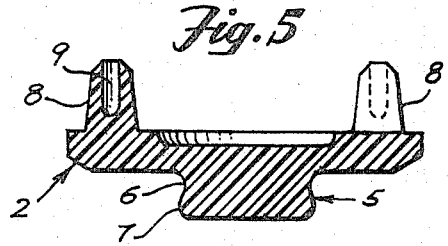
INVENTOR.
ALFRED E. CARLILE
BY Meech & Field
ATTORNEYS.

United States Patent Office 3,553,796
Patented Jan. 12, 1971

3,553,796
PLASTIC SNAP FASTENER
Alfred E. Carlile, Meadville, Pa., assignor, by mesne assignments, to Textron Inc., Providence, R.I., a corporation of Delaware
Filed Apr. 16, 1968, Ser. No. 721,807
Int. Cl. A44b 17/00; B29c 19/00
U.S. Cl. 24—216      6 Claims

ABSTRACT OF THE DISCLOSURE

A fastening device of the snap fastener type molded from a pliable plastic material by a continuous strip method consisting of four relatively flat component parts of substantially the same contour including a socket member and a stud member which may be attached to a flexible member or article merely by mechanical pressure.

---

The invention relates to snap fasteners and the method of making the same wherein both the stud and socket members are made wholly of a plastic material and are adapted to be readily united and separated with a snap action.

Heretofore, such fasteners were usually made of metal but it is now recognized that when such fasteners are made of a plastic material they have certain advantages as compared to metal snap fasteners in respect to economy and ease of manufacture, enhanced appearance, and adaptability to be colored as desired for any particular application.

It is the general object of this invention to provide such a plastic snap fastener possessing the aforesaid advantages while at the same time fulfilling the commercial requirements of a satisfactory snap fastener as to adequate strength and holding power, flat construction, and ease of commercial manufacture in a simple and inexpensive mold.

It is another object of the invention to provide an improved snap fastener having stud and socket fastener elements and an attaching member wherein all parts are made of a plastic material and wherein like attaching elements are provided for attaching both fastener elements to a support having projections arranged with either one or the other of said elements capable of piercing through the material with which they are adapted to be used and of being flared so as to permanently secure the snap fastener elements to the supporting members.

It is a further object of this invention to provide a plastic snap fastener in which the separable parts are made of such material and are so formed that the stud and socket members snap together due to the inherent distortability characteristics of the material of which the parts are made. This is accomplished by making the parts of a rigid and hard plastic moldable material and forming the head of the stud as a bulbous projection and the socket with a constricted opening.

It is still another object of the invention to provide a continuous strip of fastener elements which may be fed to a suitable device or apparatus for separating the elements so as to provide individual elements which may conveniently and economically be attached to a fabric or other supporting member.

Various other objects and advantages of this invention will be more apparent in the course of the following specification, and will be particularly pointed out in the appended claims.

In the accompanying drawings, there is shown for the purpose of illustration an embodiment which the invention may assume in practice.

Figure 8:
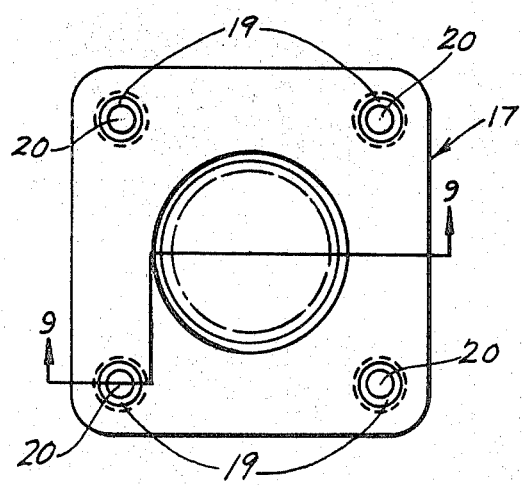
Figure 9:
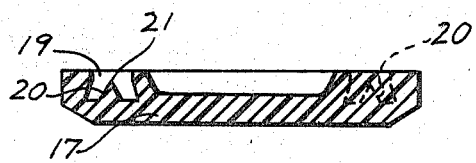
Figure 10:
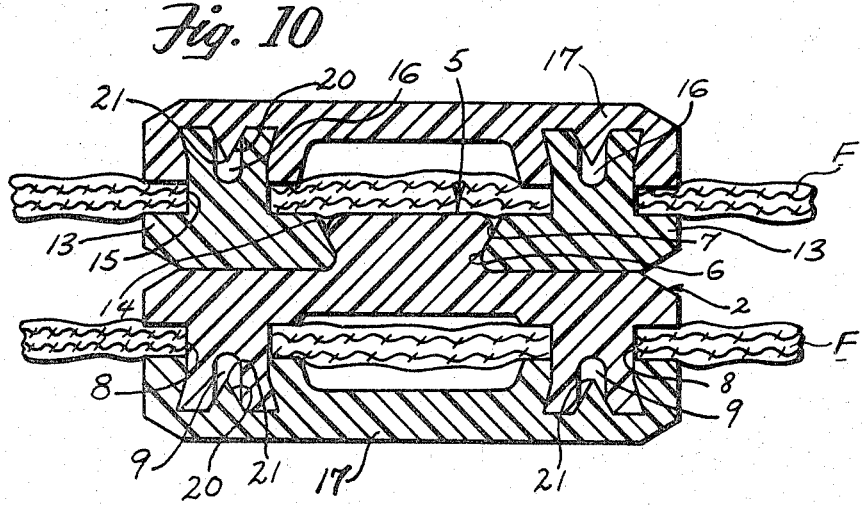

In these drawings:

FIG. 1 is a plan view of the inner side of a continuous strip of molded stud members in accordance with the present invention, FIG. 2 is a similar view of the inner side of a continuous strip of molded socket members, FIG. 3 is another plan view of the inner side of a continuous strip of back or attaching members, FIG. 4 is an enlarged plan view of the inner side of the stud member according to the invention, FIG. 5 is a view taken on line 5—5 of FIG. 4, FIG. 6 is an enlarged plan view of the inner side of the socket member, FIG. 7 is a view taken on line 7—7 of FIG. 6, FIG. 8 is an enlarged plan view of the inner side of the back or attaching member, FIG. 9 is a view taken on line 9—9 of FIG. 8, and FIG. 10 is a cross sectional view through the stud and socket members showing them interengaged and secured to flexible members in cooperation with the back or attaching members.

Referring more particularly to the drawings, there is shown in FIG. 1 a continuous strip A of snap fastener stud elements 2 connected by a pair of spaced-apart connecting portions 3. Each of the stud elements consists of a base portion 4 having a shank or stud portion 5 arranged centrally thereof and extending outwardly therein to one side thereof, as more clearly shown in FIGS. 4 and 5 of the drawings. This shank portion has a constricted neck portion 6 and a bulbous head portion 7. On the opposite side of the base portion 4, there is arranged a plurality of projections 8, four in the present instance with each having a cavity or recess 9 arranged in the outer free end axially thereof.

In FIG. 2 there is shown a continuous strip B of snap fastener socket elements 10 connected by a pair of spaced-apart connecting portions 12 with each having a base portion 13 and a constricted opening 14 arranged centrally thereof, as more clearly shown in FIGS. 6 and 7 of the drawings. On one side of this base portion 13, there is arranged a plurality of similar number of projections 15 also having a cavity or recess 16 arranged in the outer free end axially thereof.

There is shown in FIG. 3 a continuous strip C of back or attaching members 17 also connected by a pair of spaced-apart connecting portions 18. Each of the back or attaching members 17 having a plurality of recesses 19 arranged in one side thereof similar in number and position of the projections 8 and the projections 15 of the stud and socket elements 2 and 10, respectively, as more clearly shown in FIGS. 8 and 9 of the drawings. In the bottom of each of these recesses 19, there is arranged a cone-like projection 20 having a pointed end, as at 21.

Attention is now directed to FIG. 10 of the drawings where it is shown how the stud, socket and back members are attached to the supporting member or fabric F with which they are adapted to be used. In the case of the stud member 2 it is positioned on one side of the fabric so that the projections 8 penetrate the fabric. The back or attaching member 17 is then positioned on the opposite side of the fabric directly opposite the stud element with the outer ends of the projections 8 positioned in the recesses 19 of the back member. The stud and back members are then pressed together so that the pointed ends 21 of the cone-like projections 20 enter the cavities 9 in the outer ends thereof and upon further pressure will flare the ends of the projections outwardly in the bottom of the recesses, as shown in FIG. 10, so as to attach securely the stud element to the fabric. If desirable, heat may be applied as well as pressure to secure these two members together and to the fabric.

Obviously, the socket member 10 is attached to the fabric F in cooperation with a back member 17 in a like manner and, accordingly, will not be described in detail.

Thus, it will be seen that the back or attaching members 17 are identical and interchangeable in that they can be used with either the stud element 2 or the socket element 10 which is an important advantage of the present invention. It will also be seen that the elements may be conveniently molded in continuous strip form from a suitable plastic material such as Delrin, nylon and the like having inherent resilient characteristics.

In use, it will be seen that the shank portion 5 of the stud element 2 is forced into the constricted opening 14 of the socket element 10 by a snapping action whereby the bulbous head portion 7 lies behind the walls bordering the entrance to the opening 14 so as to hold the stud and socket elements securely in engagement with one another, as shown in FIG. 10 of the drawings.

While there is shown and described an embodiment which my invention may assume in practice, it will be understood that this embodiment is merely for the purpose of illustration and description and that other forms can be devised within the scope of the invention as defined in the appended claims.

I claim:
1. A snap fastener comprising the combination of stud and socket members, each made wholly of a plastic material and being relatively flat,
   a plurality of projections arranged on one side of each of said stud and socket members,
   each of said projections having a cavity arranged in the outer free end axially thereof,
   a pair of relatively flat identical back members with each having a plurality of recesses therein corresponding to the number of projections on said stud and socket members with which they cooperate, and
   a cone-like projection arranged in the bottom of each of said recesses axially thereof so as to provide pointed ends thereon,
   each of the stud and socket members adapted to be positioned on one side of the material with which the fastener is adapted to be used and a back member positioned on the opposite side directly opposite the respective stud and socket members with the projections of the respective members penetrating the material and positioned in the recesses in the respective back members whereby the stud and socket members and the respective back members firmly grip the material when the stud and socket members and respective back members are pressed together due to the fact that the pointed ends of said cone-like projections in the respective bak members enter the cavities in the ends of the respective projections of the stud and socket members and forcibly flare the end portions of the projections outwardly in the bottom portion of the respective recesses.

2. A snap fastener comprising the combination of stud and socket members, each made wholly of a plastic material, the socket member comprising a similar base portion having a constricted opening arranged centrally thereof,
   a plurality of projections arranged on one side of said base portion,
   each of said projections having a cavity arranged in the outer free end axially thereof,
   a relatively flat back member having a plurality of recesses arranged therein corresponding to the number of projections on said base portion with which they cooperate, and
   a cone-like projection arranged in the bottom of each of said recesses axially thereof so as to provide pointed ends thereon,
   the base portion adapted to be positioned on one side of the material with which the fastener is adapted to be used and the back member adapted to be positioned on the opposite side thereof directly opposite said base with the projections penetrating the material and positioned in said recesses whereby the base and back members firmly grip the material when the base and back member are pressed together due to the fact that the pointed ends of said cone-like projections enter the respective cavities in the ends of the respective projections and forcibly flare the end portions of the projections outwardly in the bottom portion of said recesses,
   the stud member comprising a similar base portion having a shank portion arranged centrally thereof and extending outwardly therefrom and terminating in a bulbous head portion which cooperates with the opening in said socket member to interengage the same, and
   means for attaching said stud member to a supporting member.

3. A snap fastener comprising the combination of stud and socket members, each made wholly of plastic material, the stud member comprising a base portion having a shank portion arranged centrally thereof and extending outwardly therefrom to one side thereof,
   said shank portion having a constricted neck portion terminating in a bulbous head portion,
   a plurality of projections arranged on the opposite side of said base,
   each of said projections having a cavity arranged in the outer free end axially thereof,
   a relatively flat back member having a plurality of recesses arranged therein corresponding to the number of projections on said base with which they cooperate,
   a cone-like projection arranged in the bottom of each of said recesses axially thereof so as to provide pointed ends thereon,
   the base portion adapted to be positioned on one side of the material with which the fastener is adapted to be used and the back member adapted to be positioned on the opposite side thereof directly opposite said base with the projections penetrating the material and positioned in said recesses whereby the base and back members firmly grip the material when the base and back member are pressed together due to the fact that the pointed ends of said cone-like projections enter the respective cavities in the ends of the respective projections and forcibly flare the end portions of the projections outwardly in the bottom portion of said recesses,
   the socket member comprising a similar base portion having a constricted opening arranged centrally thereof for receiving detachably the shank portion of said stud member for interengaging the same, and
   means for attaching said socket member to a supporting member.

4. A snap fastener comprising the combination of stud and socket members, each made wholly of a plastic material, the stud member comprising a base portion having a shank portion arranged centrally thereof and extending outwardly therefrom to one side thereof,
   said shank portion having a constricted neck portion terminating in a bulbous head portion,
   a plurality of projections arranged on the opposite side of said base,
   each of said projections having a cavity arranged in the outer free end axially thereof,
   a relatively flat back member having a plurality of recesses arranged therein corresponding to the number of projections on said base with which they cooperate,
   a cone-like projection arranged in the bottom of each of said recesses axially thereof so as to provide pointed ends thereon,
   the base portion adapted to be positioned on one side of the material with which the fastener is adapted to be used and the back member adapted to be positioned on the opposite side thereof directly opposite said base with the projections penetrating the material and positioned in said recesses whereby the base and back members firmly grip the material when the base and back member are pressed together due to the fact that the pointed ends of said cone-like projections enter the respective cavities in the ends of the respective projections and forcibly flare the end portions of the projections outwardly in the bottom portion of said recesses, the socket member comprising a similar basic portion having a constricted opening arranged centrally thereof for receiving detachably the shank portion of said stud member, a plurality of projections arranged on one side of said base portion, each of said projections having a cavity arranged in the outer free end axially thereof, another similar relatively flat back member having a plurality of recesses arranged therein corresponding to the number of projections on said base with which they cooperate, and a cone-like projection arranged in the bottom of each of said recesses axially thereof so as to provide pointed ends thereon, the base portion adapted to be positioned on one side of the material with which the fastener is adapted to be used and the back member adapted to be positioned on the opposite side thereof directly opposite said base with the projections penetrating the material and positioned in said recesses whereby the base and back members firmly grip the material when the base and back member are pressed together due to the fact that the pointed ends of said cone-like projections enter the respective cavities in the ends of the respective projections and forcibly flare the end portions of the projections outwardly in the bottom portion of said recesses.

5. The combination as defined in claim 4, wherein both of the back members are identical in construction.

6. The method of attaching a snap fastener element to a flexible supporting material which comprises:

providing a member having a plurality of projections for piercing said material and arranged on one side thereof with each having a cavity arranged in their outer free end axially thereof, providing a back member having a plurality of recesses therein corresponding to the number of projections on said first member with each recess having a pointed tapered projection therein arranged axially thereof, positioning the first member so that its projections are in alignment with the recesses of said back member, moving said first member towards said material so that its projections penetrate and move through said material, and forcing both said first member, after it has penetrated said material, and said back member together so that the pointed tapered projections enter the corresponding cavities in the ends of said projections to deform and flare the outer ends thereof within said recesses so as to attach securely the members together and to the material positioned therebetween.

References Cited

UNITED STATES PATENTS

| | | | |
|---|---|---|---|
| 3,270,385 | 9/1966 | Melanson | 24—216 |
| 1,943,063 | 1/1934 | Fenton | 24—95 |
| 2,237,329 | 4/1941 | Bischof | 29—522UX |
| 3,083,429 | 4/1963 | Barlow | 24—204UX |
| 3,164,250 | 1/1965 | Paxton | 24—30.5RSUX |
| 3,195,201 | 7/1965 | Ash | 24—208.3UX |
| 3,324,544 | 6/1967 | Haller | 29—521 |
| 3,401,434 | 9/1968 | Daddona | 24—208.3UX |

FOREIGN PATENTS

| | | | |
|---|---|---|---|
| 1,165,156 | 10/1958 | France | 221—208 |

BERNARD A. GELAK, Primary Examiner

U.S. Cl. X.R.

24—219; 29—522; 85—39; 264—249